Oct. 17, 1950     C. B. GREENBERG     2,526,023
EXPANDIBLE ADJUSTABLE LINK
Filed July 15, 1946
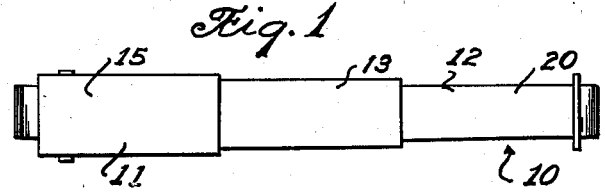
Fig. 1
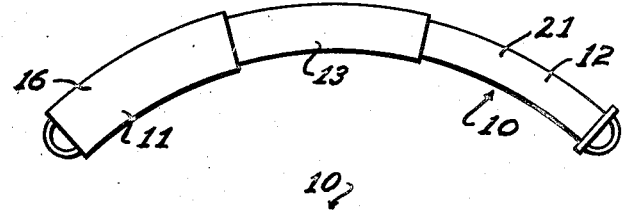
Fig. 2
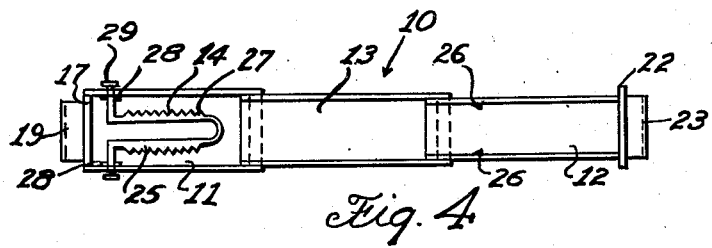
Fig. 3
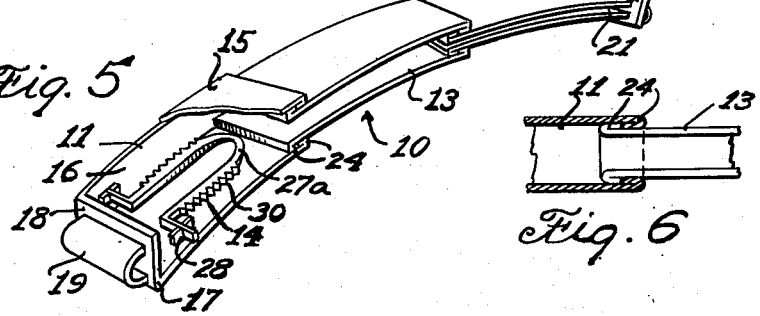
Fig. 4
Fig. 5
Fig. 6
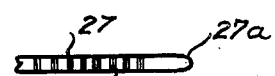
Fig. 7
Charles B. Greenberg
INVENTOR.
BY William Wolfe
ATTORNEY Patented Oct. 17, 1950

2,526,023

UNITED STATES PATENT OFFICE 2,526,023

EXPANDIBLE ADJUSTABLE LINK

Charles B. Greenberg, New York, N. Y.

Application July 15, 1946, Serial No. 683,685

1 Claim. (Cl. 24—206)

My invention relates to adjustable widely expandible link closure elements which are suitable for securing the ends of a wrist watch strap together and which permit the strap to be slid over a person's wrist.

The invention is characterized by a series of telescoping tubes, the largest of which is provided with a spring rack and the smallest with teeth or dogs capable of coacting with the rack to lock the tubes together.

An object of the invention is to form a longitudinally adjustable link which can be secured to each end of a wrist watch strap and can be expanded to several times its length to permit the strap to be slid over the wrist.

A further object is to form a link of the above type which is easily openable by two fingers of one hand and which does not require any folding or manual fitting of elements together either in expanding, contracting or adjusting.

Another object is to form a neat and sightly link capable of accomplishing the stated and other objects inexpensively and simply.

These and other objects are accomplished by forming the link of a plurality of telescoping tubes the outer end of the largest and smallest each being provided with a joining means for connecting it to an end of a wrist watch strap and the largest tube enclosing a U-shaped spring element lying longitudinally, the outer sides of the legs of the U being ribbed or toothed and the smallest tube having inwardly extending projections capable of locking with the ribs or teeth to retain the link in an adjustably closed condition with the intermediate telescoped tubes secured between the largest and smallest tube.

For further comprehension of the invention, and of the objects and advantages thereof, reference will be had to the following description and accompanying drawings, and to the appended claim in which the various novel features of the invention are more particularly set forth.

In the accompanying drawings a material part of this disclosure:

Fig. 1 is a plan view of an expandible adjustable link in an expanded condition, the link being comprised of a plurality of tubes and embodying the invention.

Fig. 2 is an elevational view of the expanded link shown in Fig. 1.

Fig. 3 is an elevational view of the link shown in Figs. 1 and 2 in a contracted or telescoped condition.

Fig. 4 is a plan view of the link shown in Fig. 1 with upper parts of the tubes cut away exposing a toothed spring within the largest tube and an inwardly extending projection within the smallest tube.

Fig. 5 is a perspective view of the link shown in Fig. 1 in an expanded condition and with parts of the tubes cut away exposing their interior.

Fig. 6 is a fragmentary detail showing the method of expandibly securing two of the telescoping tubes.

Fig. 7 is a fragmentary side view of the spring showing its sloping end.

In the drawings and in the specifications in which the same numbers indicate similar elements, a link 10 is shown comprised of tubular end elements 11 and 12, an intermediate tubular element 13, and an adjustable locking means 14, the elements 11, 12 and 13 being telescopingly positioned together to permit the link 10 to expand to several times its contracted size.

The end element 11 is rectangular in lateral cross section having wide sides 15 and narrow sides 16. In addition the element is provided with an end plate 17 positioned at the outer end of the tube. The plate 17 is provided on its outer face 18 with a curved retaining element 19 suitable for securing the link 10 to an end of a wrist watch strap.

The tubular end element 12 is rectangular in lateral cross section having wide sides 20 and narrow sides 21. The element has, in addition, an end plate 22 and a curved retaining element 23 similar to the plate 17 and retaining element 19.

The intermediate tubular element 13 is rectangular in cross section and of such a size as to fit about the tubular element 12 and within the element 11. The adjacent ends of the tubular elements are provided with opposingly positioned flanges 24 which acts as stops and prevent a disassembling of the elements after the formation of the link. The tubular elements 11, 12 and 13 are all arcuate longitudinally and contract into an arcuate link, to permit it to lie close to the wrist and present a neat and sightly appearance.

The adjustable locking means 14 is formed of a U-shaped spring 25 positioned in the tubular element 11 and a pair of projections 26, one positioned on the inside face of each of the narrow sides 21 of the element 12. The U-shaped spring 25 is positioned centrally, with its legs 27 extending longitudinally in the element 11. The curved part of the U which extends in the direction of the intermediate element 13 is sloped and rounded as at 27a (see Fig. 7) forming a wedge shaped rounded leading end so that the spring 25 can enter easily into the tubular elements 13 and 12 when the link is contracted. The ends of the legs 27 of the U are bent normally outwardly and each is provided with a stop 28 and a press button 29. The stops 28 are positioned inside the element 11 and the buttons 29 are secured outside the element 11 to the ends of the bent portions of the legs extending through the narrow sides 16 adjacent the plate 17. The outer sides of the legs are provided with teeth, ribs or projections 30, which extend outwardly so that, normally under the spring pressure holding the legs apart, they coact with the projections 26 on the narrow sides of the element 12 and lock the elements 11 and 12 together. To release the elements, the buttons 29 are pressed toward each other bending the spring legs inwardly and releasing the teeth from their coacting projections. The fact that there are a plurality of teeth extending for a considerable distance along the legs, any one of which being able to coact with a projection 26, permits the contracted link length to be easily changed or adjusted. The link, when the locking means 14 is not functioning, can be expanded to nearly the length of the three tubular elements to permit a strap, secured at its ends to the retaining elements 19 and 23, to be elongated enough to be slid over a person's wrist.

It should be particularly noticed that the operation of expanding and contracting the link is performed simply by pressing the buttons, no fitting of elements being required and that this expanding and contracting operation includes the act of adjusting or setting the strap to the required degree of tightness.

While I have illustrated and described the preferred embodiments of this invention, it is to be understood that I do not limit myself to the precise constructions herein disclosed and the right is reserved to all changes and modifications coming within the scope of the invention as defined in the appended claim.

Having thus described my invention, what I claim as new and novel and desire to secure by United States Letters Patent is:

An expandible adjustable link, for securing the ends of a wrist watch strap, comprising tubular end elements, an intermediate tubular element and a locking means, the end elements having securing means for being joined to the strap ends and all the elements being telescopingly positioned together, the locking means being formed of a rack positioned in and secured to one of the end elements and a projection in the other end element, the rack being formed of flexible springy material and shaped like a U and positioned longitudinally in the largest element with the back of the U towards the other elements, the teeth of the rack being positioned on an outside face of a leg of the U and the rack and projection coacting together to retain the elements in a telescoped condition.

CHARLES B. GREENBERG.

REFERENCES CITED

The following references are of record in the file of this patent:

UNITED STATES PATENTS

| Number | Name | Date |
|---|---|---|
| 637,331 | Flicek | Nov. 21, 1899 |
| 750,643 | Happich | Jan. 26, 1904 |
| 796,490 | Baker | Aug. 8, 1905 |
| 1,056,452 | Remhilt | Mar. 18, 1913 |
| 1,439,812 | Goodrich | Dec. 26, 1922 |
| 1,651,134 | King | Nov. 29, 1927 |
| 1,732,267 | Grassmann | Oct. 22, 1929 |
| 1,801,963 | Kliem | Apr. 21, 1931 |